March 4, 1930.  F. W. SCHROEDER  1,749,305
VEHICLE SIGNAL
Filed Nov. 4, 1927
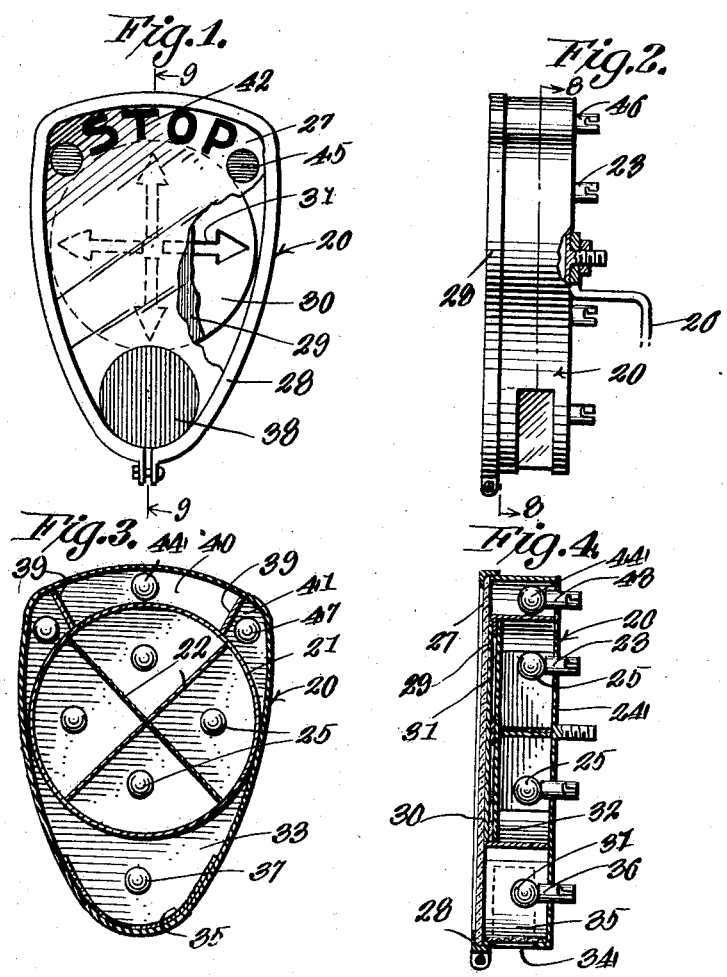
WITNESSES
Inventor
FRANK W. SCHROEDER
By Richard B. Owen
Attorney Patented Mar. 4, 1930

1,749,305

UNITED STATES PATENT OFFICE

FRANK W. SCHROEDER, OF BEMIDJI, MINNESOTA

VEHICLE SIGNAL

Application filed November 4, 1927. Serial No. 231,133.

This invention relates to improvements in signals for automobiles and has as its general object to provide a signal which may be readily installed upon any type of automobile and by means of which the driver of the automobile may indicate his intention to make a turn toward the right or toward the left or to stop or proceed, without the necessity of signaling with his left hand.

Another object of this invention is the particular construction of a signal casing having the partition so arranged as to efficiently hold the same in proper position within the casing.

While the accompanying drawings and the description which is to follow, constitute a disclosure of the preferred embodiment of the invention, it will be understood that various changes may be made within the scope of what is claimed.

In the accompanying drawings:

Figure 1 is a detail rear elevation of the rear signal, a part being broken away to better illustrate the construction;

Figure 2 is a view in side elevation of the rear signal;

Figure 3 is a vertical transverse sectional view taken substantially on the line 8—8 of Figure 2 looking in the direction indicated by the arrows;

Figure 4 is a vertical front to rear sectional view taken substantially on the line 9—9 of Figure 1 looking in the direction indicated by the arrows.

The signal comprises a casing 20 within which is arranged an annular partition wall 21 within which are arranged partition plates 22, sockets 23 being mounted in the rear wall 24 of the casing 20, and light bulbs 25 being arranged within the sockets and each positioned within an individual one of the compartments defined by the partition plates 22 and circumferential wall 21. The casing 20 is mounted by a bracket 26 preferably upon the spare tire carrier of the automobile, and the front of the casing has mounted therein a pane 27 of transparent material which extends over the entire front of the casing 20 and which is held in place by a suitable rim 28. The annular wall 21 is concentrically arranged within the casing 20 with its opposite sides in contact with the opposite side walls of the casing, and a pane 29 of red glass is arranged within the circumference of this wall and against the inner side of the pane 27, and against the inner side of the said pane 29 there is arranged a circular plate 30 of opaque material in which are formed openings 31 each of the contour of an arrow. Therefore one of the electric light bulbs 25 is located immediately in rear of each one of the openings 31, so that when any one of the bulbs is lighted, the rays therefrom will be projected solely through the respective opening 31. A translucent circular pane 32 is arranged within the bounds of the wall 21 and between the rear side of the plate 30 and the forward edges of the partition plates 22. In the rear signal, the engagement of the opposite sides of the annular wall 21 with the side walls of the casing 20 serves to define a compartment 33 in the lower portion of the casing 20, and an opening 34 is formed in the bottom of the casing wall 20 and a sheet of transparent material 35 is arranged within the bottom of the said casing 20 and extends over the said opening 34, a socket 36 being arranged in the rear wall 24 of the said casing 20 and a bulb 37 being arranged in the socket and, when lighted, serving to project light rays downwardly through the sheet 35 and opening 34 onto the license plate of the automobile which is ordinarily supported upon the spare tire carrier. In order that the bulb 37 may likewise constitute a tail light, the pane 27 is provided with a circular area 38 red in color, and this area is located immediately opposite the light bulb 37. Partition walls 39 are arranged within the casing 20 and extend between the upper side of the annular wall 21 and the top wall of the said casing, and these partition walls, together with the walls of the casing, define compartments indicated by the numerals 40 and 41. The portion of the pane 27 which extends over the front of the partition 40 has depicted thereon, in red, the letters of the word "Stop" as indicated by the numeral 42, and a socket 43 is mounted in the rear wall 24 of the casing 20 and carries an electric light bulb 44 which, when lighted, serves to illuminate the said colored letter portions of the pane 27. The pane 27 is further provided, at the front of the compartment 41, with a circular green area indicated by the numeral 45, and a socket 46 is mounted in the rear wall 24 of the casing and extends into each of these compartments, and electric light bulbs 47 are arranged in said sockets and, when lighted, illuminate the green area 45 so that this portion of the signal may constitute a parking light.

Having thus described the invention, what I claim is:

In a signal for automobiles a casing having downwardly converging side walls merging at the bottom of the casing, a top wall and front and rear walls, an annular partition wall mounted within the casing extending between the front and rear walls thereof, and engaging the opposite side walls of the casing for permitting the annular partition wall to be wedged in between the side walls for firmly anchoring the annular wall in position, the annular partition wall being supported in spaced relation to the top wall of the casing and in spaced relation with respect to the merged lower ends of the side walls for producing a plurality of light bulb receiving compartments, and bracing means constituting partitions interposed between the annular partition wall and the top wall of the casing, and lighting means positioned within the various compartments so formed.

In testimony whereof I affix my signature.

FRANK W. SCHROEDER.